United States Patent
Coglitore et al.

(10) Patent No.: US 11,258,716 B1
(45) Date of Patent: Feb. 22, 2022

(54) SYSTEM AND METHOD FOR OPTIMIZING DYNAMIC MULTI-STREAM NETWORK CONNECTIONS

(71) Applicant: R-Stor Inc., Saratoga, CA (US)

(72) Inventors: Giovanni Coglitore, Saratoga, CA (US); Damian Kowalewski, Sunnyvale, CA (US); Georgiy Yakovlev, Pacifica, CA (US)

(73) Assignee: R-Stor Inc., Saratoga, CA (US)

( * ) Notice: Subject to any disclaimer, the term of this patent is extended or adjusted under 35 U.S.C. 154(b) by 0 days.

(21) Appl. No.: 15/931,427

(22) Filed: May 13, 2020

Related U.S. Application Data (60) Provisional application No. 62/847,555, filed on May 14, 2019.

(51) Int. Cl.
| | |
|---|---|
| *G06F 15/16* | (2006.01) |
| *H04L 47/2425* | (2022.01) |
| *H04L 69/16* | (2022.01) |
| *H04L 47/2491* | (2022.01) |
| *H04L 43/0829* | (2022.01) |
| *H04L 47/283* | (2022.01) |

(52) U.S. Cl.
CPC ...... *H04L 47/2425* (2013.01); *H04L 43/0829* (2013.01); *H04L 47/2491* (2013.01); *H04L 47/283* (2013.01); *H04L 69/16* (2013.01)

(58) Field of Classification Search
CPC ... H04L 29/06; H04L 63/306; H04L 67/2804; H04L 67/2814; H04L 69/16; H04L 43/0852; H04L 65/4069; H04L 65/80; H04L 43/0829; H04L 43/0882; H04L 43/0888; H04L 65/608; H04L 67/1008; H04L 67/1029; H04L 67/42; H04L 41/046; H04L 41/0896; H04L 43/0817; H04L 43/0876; H04L 47/11; H04W 12/069

See application file for complete search history.

(56) References Cited

U.S. PATENT DOCUMENTS

| | | | |
|---|---|---|---|
| 9,774,512 B1* | 9/2017 | Zuevsky | H04L 43/0817 |
| 2002/0002618 A1* | 1/2002 | Vange | H04L 67/2804 |
| | | | 709/228 |
| 2014/0226658 A1* | 8/2014 | Kakadia | H04L 43/0876 |
| | | | 370/389 |
| 2014/0280398 A1* | 9/2014 | Smith | H04L 69/326 |
| | | | 707/825 |

* cited by examiner

*Primary Examiner* — Phuc H Tran
(74) *Attorney, Agent, or Firm* — Rankin, Hill & Clark LLP

(57) ABSTRACT

A system for optimizing dynamic multi-stream network connections and methods for making and using the same. In various embodiments, the system advantageously can use a full bandwidth available between two network appliances connected by a Transmission Control Protocol (TCP) network connection with well-defined round-trip time (RTT) latency and changing bandwidth, among other things.

17 Claims, 5 Drawing Sheets

SYSTEM AND METHOD FOR OPTIMIZING DYNAMIC MULTI-STREAM NETWORK CONNECTIONS

CROSS-REFERENCE TO RELATED APPLICATIONS

This application claims the benefit of, and priority to, U.S. Provisional Application Ser. No. 62/847,555, filed May 14, 2019, the disclosure of which is hereby incorporated herein by reference in its entirety and for all purposes.

FIELD

The present disclosure relates generally to digital data processing and more particularly, but not exclusively, to systems and methods for optimizing dynamic multi-stream network connections.

BACKGROUND

When transferring data using multiple Transmission Control Protocol (TCP) connections, the available bandwidth of the connections can increase or decrease for a variable period of time. It is therefore imperative to adjust previously determined parameters to achieve optimal bandwidth utilization. Such changes have to happen in time that is insignificant as compared the period the different bandwidth is available.

In view of the foregoing, a need exists for an improved system and method for optimizing dynamic multi-stream network connections in an effort to overcome the aforementioned obstacles, challenges and deficiencies of conventional data transfer systems.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

Since conventional data transfer systems include network connections with available bandwidth that can increase or decrease for a variable period of time, a system and method for optimizing dynamic multi-stream network connections can prove desirable and provide a basis for a wide range of computer applications. This result can be achieved, according to one embodiment disclosed herein, by a system 100 for optimizing dynamic multi-stream network connections between network components as illustrated in FIG. 1.

Figure 1:
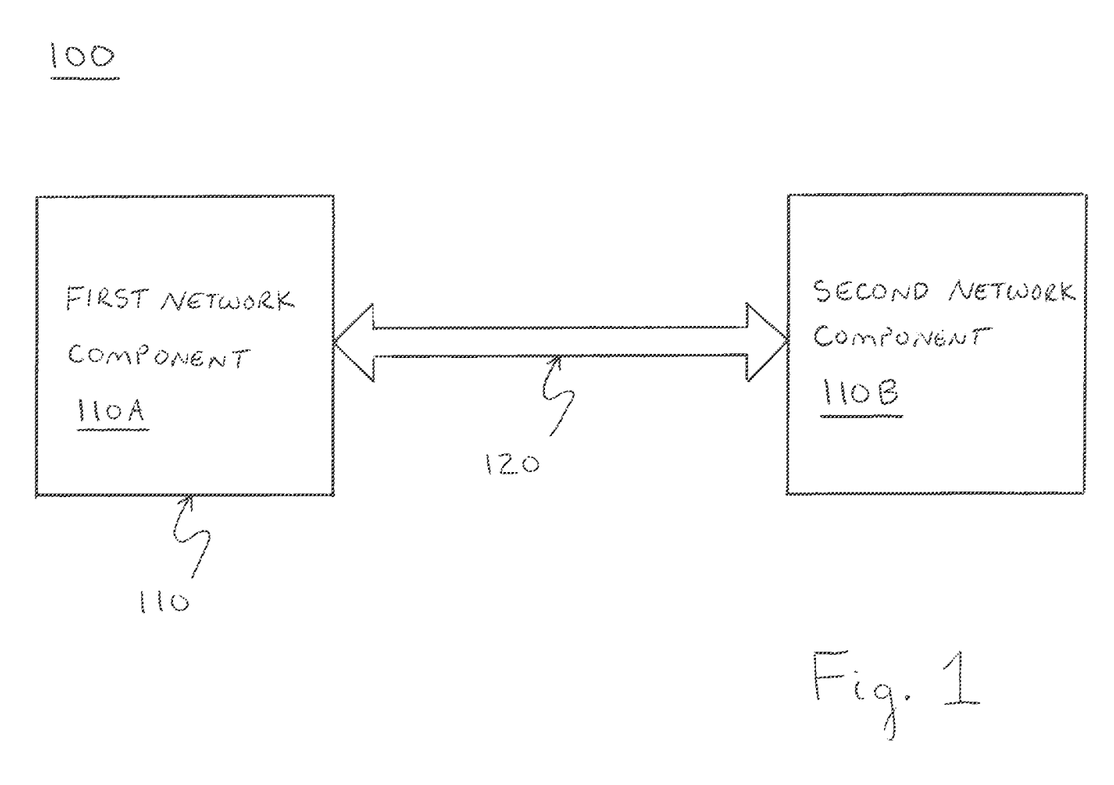
FIG. 1 is a top-level block diagram illustrating an exemplary embodiment of system for optimizing a network connection between network components.

Turning to FIG. 1, the connection optimization system 100 is shown as including a plurality of networked components 110. Each of the network components 110 can comprise any conventional type of network component, such as a server, computer, workstation, data storage system, hub, router, bridge, switch, repeater, gateway, modem, and/or access point without limitation. As shown in FIG. 1, the network components 110 can include a first network component 110A that is in communication with a second network component 110B via a network connection 120.

The network connection 120 can include one or more operating parameters. The operating parameters can include at least one fixed (or constant) operating parameter and at least one dynamic operating parameter. An exemplary fixed operating parameter can be a round trip time (RTT) latency 124 (shown in FIG. 3A) for the network connection 120. The round trip time latency value can comprise a sum of a first time interval for a data packet to travel across the network connection 120 from the first network component 110A to the second network component 110B and a second time interval for a data receipt acknowledgement to travel back across the network connection 120 from the second network component 110B to the first network component 110A. An increased round trip time latency value can lead to a decreased line utilization of the network connection 120.

An exemplary dynamic operating parameter of the network connection 120 can be a bandwidth (or throughput) 122 (shown in FIG. 3A), without limitation. An increased bandwidth value can lead to a reduced line utilization of a selected data stream of the network connection 120.

In selected embodiments, the network connection 120 can include a multi-stream network connection. An exemplary multi-stream network connection can comprise a Transmission Control Protocol (TCP) network connection. If provided as a multi-stream network connection, the operating parameters of the network connection 120 can include, for example, a count value of the sockets 128 (shown in FIG. 3A) for the network connection 120. The socket count value can be utilized for establishing a number of data streams that can be simultaneously transferred across the network connection 120. In other words, the socket count value can establish a number of data channels of the network connection 120 that can be utilized for transferring the data streams. An increased number of data streams can lead to an increased line utilization for the network connection 120.

The connection optimization system 100 advantageously can determine an optimized value for one or more of the operating parameters and thereby improve data transmission across of the network connection 120. In selected embodiments, the connection optimization system 100 can determine the optimized operating parameter values for data transmission across the network connection 120 between the first and second network components 110A, 110B based upon a predetermined number of selected parameters of the network connection 120. The connection optimization system 100 thereby can enable the first and second network components 110A, 110B to utilize a full bandwidth of the network connection 120 during the data transmission, for example, upon detecting significant bandwidth underutilization of the network connection 120.

Although shown and described with reference to FIG. 1 as comprising a single network connection 120 between two network components 110 for purposes of illustration only, the connection optimization system 100 can include any desired number of network connections 120, and each network connection 120 can couple two or more network components 110. Accordingly, in selected embodiments, the connection optimization system 100 can determine an optimized value for the operating parameters of each of the network connections 120 and thereby improve data transmission across each network connection 120.

Figure 2:
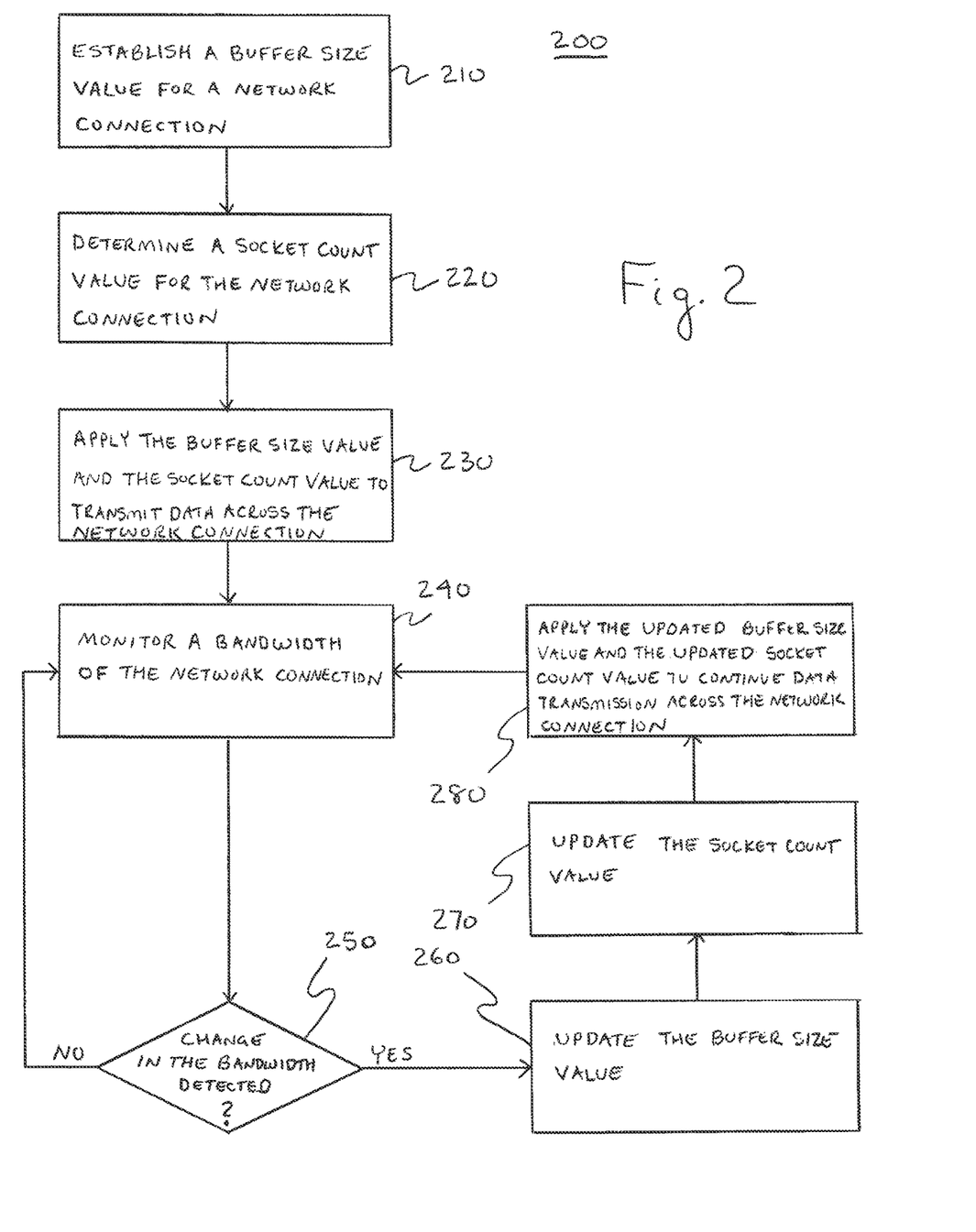
FIG. 2 is a top-level flow chart illustrating an exemplary embodiment of a method for optimizing the network connection of FIG. 1 based upon an established data buffer size value and a determination of an optimized socket count value for the network connection.

FIG. 2 illustrates an exemplary method 200 for optimizing the network connection 120 (shown in FIG. 1) for utilizing a full bandwidth available between the first and second network components 110A, 110B (shown in FIG. 1) connected by the network connection 120. Turning to FIG. 2, the method 200 is shown for optimizing the network connection 120 based upon an initial data buffer size value for a data buffer 126 (shown in FIG. 3A). The initial data buffer size value can be utilized to establish a size of a data block to be transferred across the network connection 120. Additionally, and/or alternatively, the method 200 can optimize the network connection 120 based upon an initial socket count value for establishing a number of data streams that can be simultaneously transferred across the network connection 120. The initial socket count value, in other words, can establish a number of data channels of the network connection 120 that can be utilized for transferring the data streams. The connection optimization method 200 thereby can improve data transmission across the network connection 120.

At 210, the method 200 can establish the initial data buffer size value for the network connection 120 in accordance with Equation 1.

$$\text{Data Buffer Size Value}=\text{Min}(\text{Bandwidth Value}*\text{RTT Latency Value}, \text{Constant}) \quad \text{(Equation 1)}$$

The constant can be determined based upon a smaller of the supported buffer size by network components and/or available memory. In selected embodiments, the constant can comprise any suitable number within a range between 0 Gigabit and 1 Gigabit, or more, based upon and preferably is equal to 32 Megabit.

In accordance with Equation 1, the data buffer size value can comprise the smaller of the constant and a product of the bandwidth value and the round trip time latency value. The initial data buffer size value can be established, for example, as a predetermined value based upon a data rate of the network connection 120. If the network connection 120 has a data rate of 100 Gigabits per second or less, an exemplary initial data buffer size value can be established as 1 Megabit. It will be appreciated that the initial data buffer size value should be increased proportionally for network connections with higher data rates.

The connection optimization method 200, at 220, likewise can determine an initial optimized socket count value based upon one or more defined parameters of the network connection 120. The initial optimized socket count value can be determined, for example, based upon the bandwidth value, the round trip time (or RTT) latency value and/or the data buffer size value for the network connection 120. In selected embodiments, the socket count value can be calculated in accordance with the following Equation.

$$\text{Socket Count Value}=\text{Bandwidth Value}*\text{RTT Latency Value}/\text{Data Buffer Size Value} \quad \text{(Equation 2)}$$

According to Equation 2, the socket count value can comprise a product of the bandwidth value and the round trip time latency value being, the product then being divided by the data buffer size value.

As desired, the number of data streams that can be simultaneously transferred across the network connection 120 and/or the socket count value can be determined as a preselected number (and/or a preselected range of numbers). In selected embodiments, the number of data streams that can be simultaneously transferred across the network connection 120 and/or the socket count value can be determined by a product of a factor, such as the integer two, and connection bandwidth then multiplying the product by connection latency divided by the previously-determined buffers size, without limitation. Exemplary preselected ranges of the number of data streams and/or the socket count value can include a range between 4K and 16K, including any sub-ranges, such as a 4K sub-range (i.e., between 4K and 8K) and/or a 8K sub-range (i.e., between 4K and 12K), within the preselected number range, without limitation.

In some embodiments, the number of data streams that can be simultaneously transferred across the network connection 120 and/or the socket count value can be limited by an operating system kernel setting. The socket count value in these embodiments typically are limited to 1024 but, in some instances, can be increased up to 32K.

The initial data buffer size value and the initial optimized socket count value can be applied to the network connection 120, at 230, to initiate transmission of data across the network connection 120 between the first and second network components 110A, 110B. In selected embodiments, the bandwidth can comprise an initial bandwidth at initiation of the data streams across the network connection 120. The bandwidth can comprise a static (or constant) bandwidth or a changing (or dynamic) bandwidth during transmission of the data streams across the network connection 120.

At 240, the bandwidth of the network connection 120 can be monitored. In selected embodiments, a packet loss of the data transmission across the network connection 120 can be monitored.

The monitored bandwidth can be examined to detect any change to the bandwidth of the network connection 120, at 250. For example, since packet loss can result from the changing (or dynamic) bandwidth of the network connection 120, an amount of packet loss can be compared with a predetermined packet loss threshold. If the monitored amount of packet loss is less than the predetermined packet loss threshold (for example, 2% of packets re-transmitted), the data transmission across the network connection 120 can continue, and the method 200 can continues to monitor the data transmission across the network connection 120, at 240.

If any change (or meaningful change) to the bandwidth of the network connection 120 is detected, the method 200 can determine one or more updated operating parameters for the network connection 120 in view of the detected bandwidth change. In selected embodiments, the updated operating parameters for the network connection 120 can be based upon the packet loss amount if the monitored amount of packet loss is greater than the predetermined packet loss threshold.

For example, the method 200, at 260, can update the initial data buffer size value to provide an updated data buffer size value. The updated data buffer size value can comprise a reduced value of the initial data buffer size value if a reduction in the bandwidth of the network connection 120 is detected and/or if the monitored amount of packet loss is greater than the predetermined packet loss threshold. Additionally and/or alternatively, the updated data buffer size value can comprise an increased data buffer size value if an increase in the bandwidth of the network connection 120 is detected and/or if the monitored amount of packet loss is less than the predetermined packet loss threshold. The data loss, for example, can be directly correlated to the data buffer size value. In selected embodiments, the data buffer size value can be adjusted in discrete steps such that the effective data rate preferably is not affected.

Additionally and/or alternatively, the method 200 can update the initial optimized socket count value to an updated optimized socket count value, at 270. The updated optimized socket count value can comprise an increased value of the initial optimized socket count value if a reduction in the bandwidth of the network connection 120 is detected and/or if the monitored amount of packet loss is greater than the predetermined packet loss threshold. Additionally and/or alternatively, the updated optimized socket count value can comprise a reduced optimized socket count value if an increase in the bandwidth of the network connection 120 is detected and/or if the monitored amount of packet loss is less than the predetermined packet loss threshold. In selected embodiments, the initial optimized socket count value can be increased in proportion to the decrease in the data buffer size value. The optimized socket count value, for example, can be updated in discrete steps such that the effective data rate preferably is not affected.

At 280, the updated data buffer size value and/or the updated optimized socket count value can be applied to the network connection 120. The data transmission across the network connection 120 between the first and second network components 110A, 110B thus can continue in accordance with the updated data buffer size value and/or the updated optimized socket count value. In other words, the updated data buffer size value can establish an updated number of data channels of the network connection 120 that can be utilized for transferring the data streams.

The method 200, at 240, can monitor any further packet loss of the data transmission across the network connection 120. Accordingly, the method 200 can detect bandwidth changes for the network connection 120 and determine one or more operating parameter values for adjusting operation of the network connection 120 during data transmission to the utilize the available bandwidth of the network connection 120.

In selected embodiments, the data buffer size value(s) and/or the optimized socket count value(s) can be determined by a transmitting (or source) network component 110, such as the first network component 110A, during initiation of a data transmission to a receiving (or destination) network component 110, such as the second network component 110B, via the network connection 120. The transmitting network component 110, for example, comprise a server, computer, workstation or the like in the manner set forth herein. Additionally and/or alternatively, the transmitting network component 110 can include a processing system (not shown) for determining the optimized data buffer size value and/or the optimized socket count value. The processing system can comprise any appropriate number and type of conventional processing systems, such as one or more microprocessors (µPs), central processing units (CPUs), digital signal processors (DSPs), and/or coder/decoders (CODECs).

The transmitting network component 110, for example, can apply the initial data buffer size value to the network connection 120 once, such as at the initiation of the data transmission. Additionally and/or alternatively, the transmitting network component 110 can apply the initial optimized socket count value to the network connection 120 at the initiation of the data transmission. In the manner discussed herein, the transmitting network component 110 can update the data buffer size value(s) and/or the optimized socket count value(s) changes in the bandwidth of the network connection 120 and thereby further improve performance of the network connection 120. In some embodiments, the transmitting network component 110 can update the optimized socket count value periodically, based upon one or more changing operating parameters, such as the bandwidth, of the network connection 120, and/or in accordance with any other predetermined criteria.

The method 100 of FIG. 2 is shown as comprising specific steps that can be applied in a predetermined sequence. In selected embodiments, the method 100 can include measuring latency, measuring packet loss, establishing socket buffer size, determining a number of concurrent connections for achieving a desired transmission performance and bandwidth. After establishing the socket buffer size and determining the number of concurrent connections, one or more parameters of the network can change. Exemplary network parameters can include, but are not limited to, network latency and/or bandwidth. Any change to the network parameters can result in the connection not being optimized after the change. The method 100 advantageous can continue to maintain the desired transmission performance and bandwidth, as much as possible, if the network parameters change.

Although shown and described with reference to FIG. 2 as comprising optimizing a single network connection 120 between two network components 110 for purposes of illustration only, the connection optimization method 200 can optimize any desired number of network connections 120 that can couple two or more network components 110. The connection optimization system 100 advantageously can determine an optimized value for each of one or more operating parameters and thereby improve data transmission across each of the network connections 120.

Figure 3A:
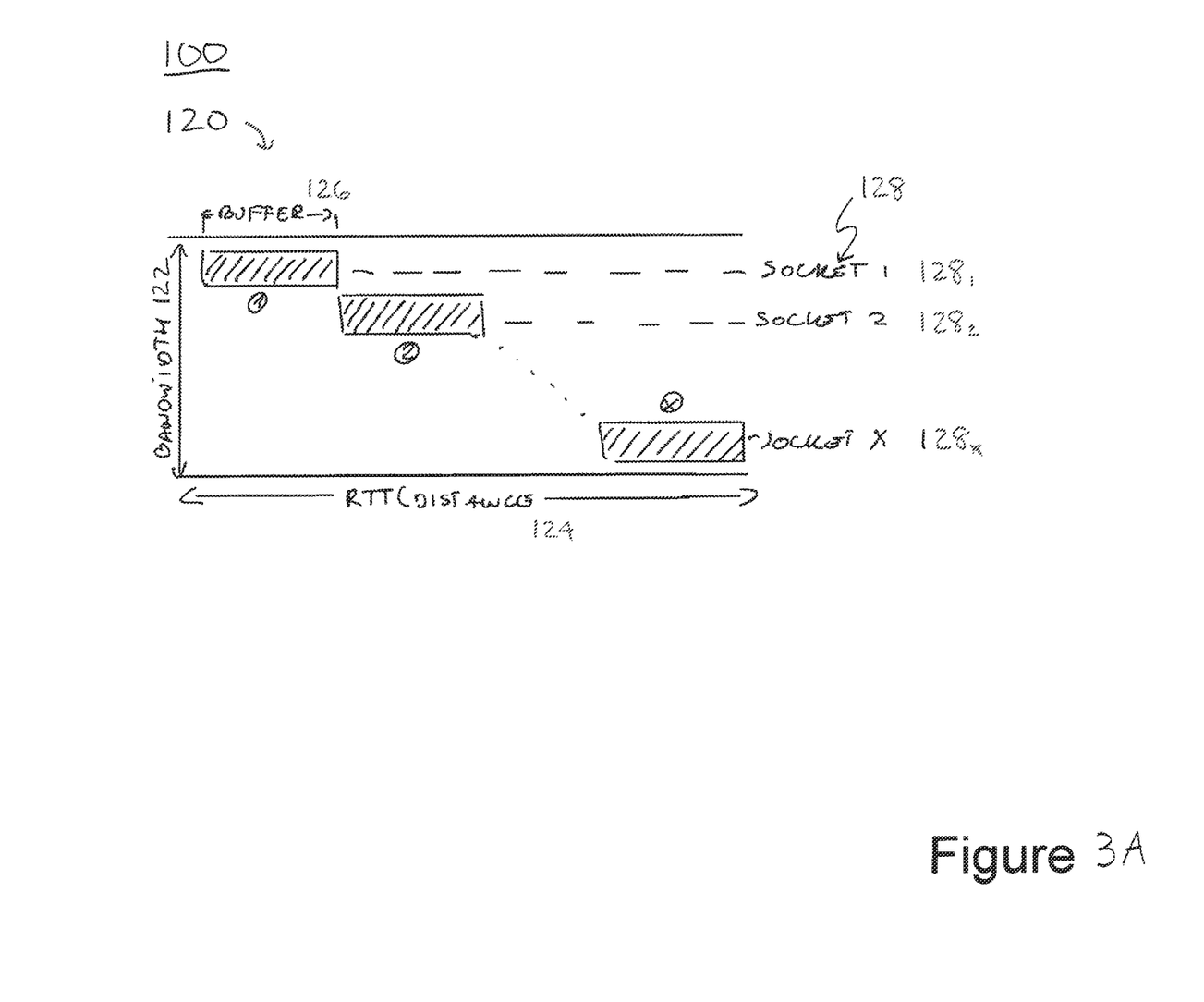
FIG. 3A is a detail drawing illustrating exemplary operation of the network connection of FIG. 1, wherein the network connection has been optimized based upon the initial operating parameters and an initial available bandwidth for the network connection at initiation of the data transmission across the network connection.
Figure 3B:
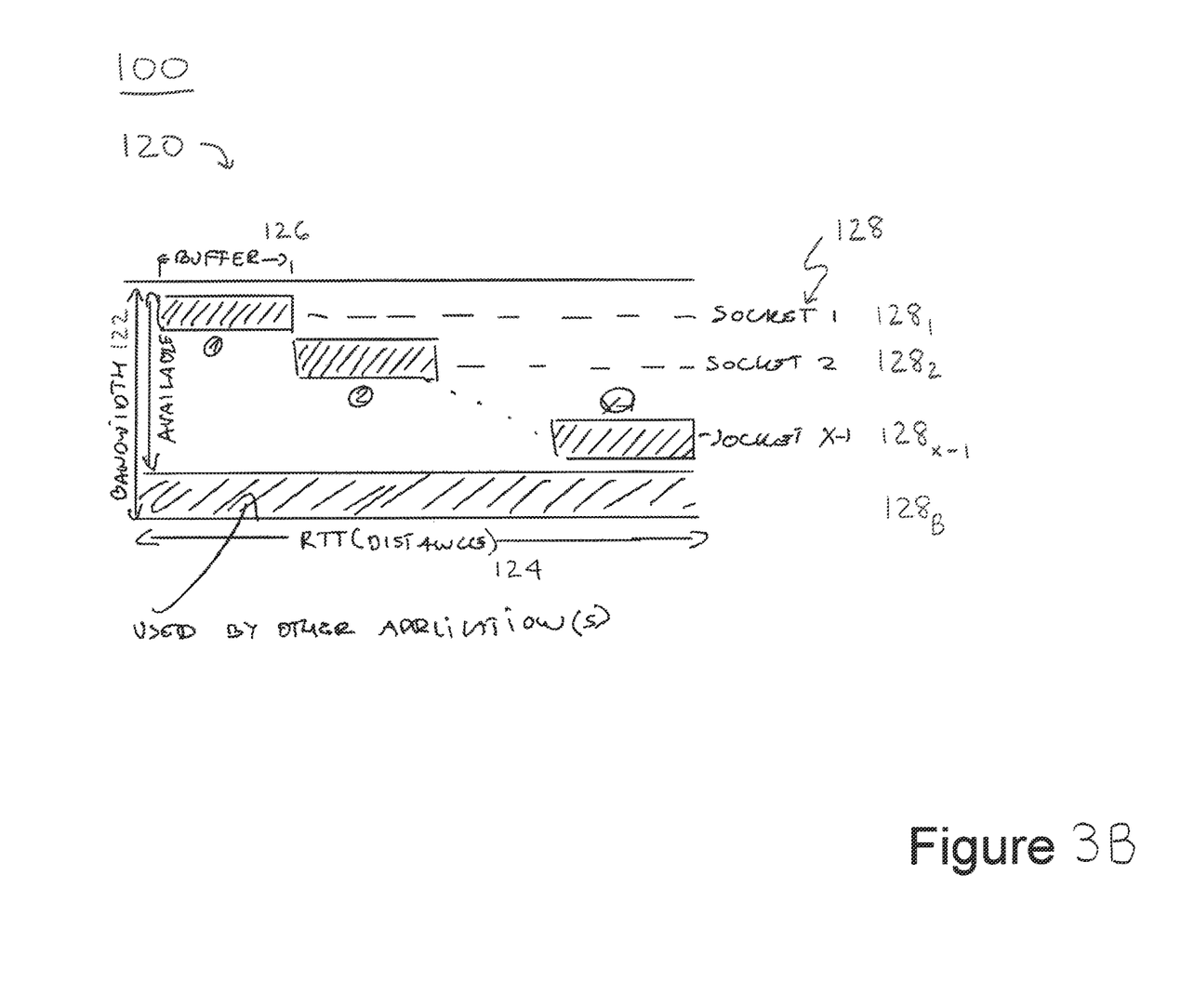
FIG. 3B is a detail drawing illustrating an alternative embodiment of the network connection operation of FIG. 3A, wherein the network connection has been optimized based upon updated operating parameters for the network connection after a reduction in the available bandwidth.
Figure 3C:
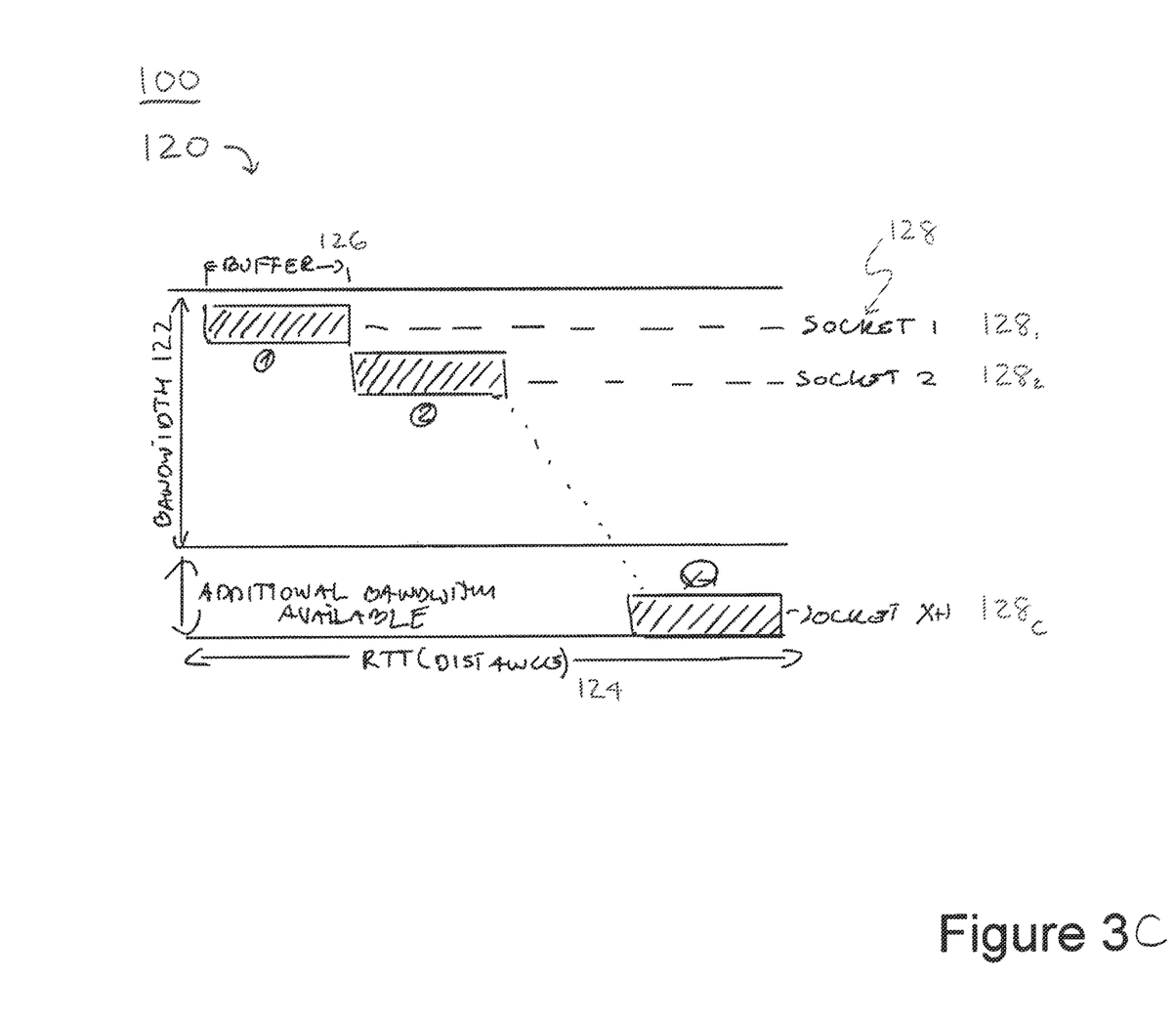
FIG. 3C is a detail drawing illustrating another alternative embodiment of the network connection operation of FIG. 3A, wherein the network connection has been optimized based upon updated operating parameters for the network connection after an increase in the available bandwidth.

Exemplary operation of the network connection 120 is illustrated in FIGS. 3A-C. Turning to FIG. 3A, the network connection 120 is shown as being optimized at initiation of the data transmission across the network connection 120 between the first and second network components 110A, 110B (shown in FIG. 1). The network connection 120 thus can be optimized based upon one or more optimized operating parameter values for the network connection 200 in the manner set forth in more detail above.

As illustrated in FIG. 3A, the network connection 120 can have a bandwidth 122 and a round trip time latency 124. The round trip time latency 124 may be a defined parameters of the network connection 120; whereas, the bandwidth 122 can comprise the defined full bandwidth or a changing (or dynamic) bandwidth of the network connection 120. In selected embodiments, the bandwidth value can comprise an initial bandwidth at the initiation of the data streams across the network connection 120.

The network connection 120 of FIG. 3A also includes a predetermined number X of sockets $128_1$, $128_2$, $128_3$, ..., $128_X$ for supporting X simultaneous data streams. The predetermined number X of sockets 128 preferably is based upon the determined initial optimized socket count value. Each of the sockets 128 is shown as being associated with a respective data buffer 126. The data buffers preferably have sizes that are based upon the established initial data buffer size. Accordingly, the connection optimization system 100 can enable utilization of the available bandwidth of the network connection 120 at the initiation of the data transmission.

Turning to FIG. 3B, the network connection 120 of FIG. 3A is shown with a selected data channel $128_B$ of the network connection 120 being reallocated for use by a different application. Stated somewhat differently, the selected data channel $128_E$ of the network connection 120 that the connection optimization system 100 previously used to transmit data in FIG. 3A is shown as being reallocated in FIG. 3B for use by a different application. The selected data channel $128_E$ shown in FIG. 3B thus is no longer available for the data transmission between the first and second network components 110A, 110B (shown in FIG. 1). The bandwidth value of the network connection 120 thus has changed to a reduced bandwidth value, being less than the initial bandwidth value, during transmission of the data streams across the network connection 120.

In selected embodiments, the connection optimization system 100, while monitoring the amount of packet loss, at 240 (shown in FIG. 2), can detect the reduced available bandwidth of the network connection 120. The connection optimization system 100 advantageously can determine one or more updated operating parameters for the network connection 120 based upon the reduced available bandwidth. Stated somewhat differently, the connection optimization system 100 can detect that the network connection 120 of FIG. 3B has only sockets $128_1$, $128_2$, $128_3$, . . . , $128_{X-1}$ available for supporting X−1 simultaneous data streams. The connection optimization system 100 thus can endeavor to maintain the data transmission via the network connection 120 without the selected data channel $128_B$.

The one or more updated operating parameters for the network connection 120, for example, can include, but are not limited to, the updated data buffer size value, at 260, and/or the updated socket count value, at 270. Accordingly, the connection optimization system 100 can enable utilization of the reduced available bandwidth of the network connection 120 due to the selected data channel $128_E$ of the network connection 120 no longer being available for the data transmission between the first and second network components 110A, 110B (shown in FIG. 1). Accordingly, the connection optimization system 100 can detect bandwidth changes for the network connection 120 and determine one or more updated operating parameter values for adjusting operation of the network connection 120 during data transmission to the utilize the available bandwidth of the network connection 120.

Although shown and described with reference to FIG. 3B as comprising a single unavailable data channel $128_B$ for purposes of illustration only, more than one data channel 128 of the network connection 120 can be reallocated and no longer available be for the data transmission between the first and second network components 110A, 110B. The connection optimization system 100, while monitoring the amount of packet loss, at 240 (shown in FIG. 2), can detect this further-reduced available bandwidth of the network connection 120. The connection optimization system 100 advantageously can determine one or more updated operating parameters for the network connection 120 based upon the further-reduced available bandwidth. The connection optimization system 100 thus can detect the further bandwidth change for the network connection 120 and determine one or more updated operating parameter values for adjusting operation of the network connection 120 during data transmission to the utilize the available bandwidth of the network connection 120.

FIG. 3C shows the network connection 120 of FIG. 3A with a selected data channel $128c$ of the network connection 120 being reallocated for use for the data transmission between the first and second network components 110A, 110B (shown in FIG. 1). In other words, the selected data channel $128c$ of the network connection 120 that was previously utilized by one or more different applications is shown in FIG. 3C as being reallocated for use by the connection optimization system 100 to transmit data between the first and second network components 110A, 110B. The selected data channel $128c$ thus was unavailable for the data transmission between the first and second network components 110A, 110B with reference to FIG. 3A but is available for the data transmission between the first and second network components 110A, 110B with reference to FIG. 3C. The bandwidth value of the network connection 120 thus has changed to an increased bandwidth value, being greater than the initial bandwidth value, during transmission of the data streams across the network connection 120.

In selected embodiments, the connection optimization system 100, while monitoring the amount of packet loss, at 240 (shown in FIG. 2), can detect the increased available bandwidth of the network connection 120. The connection optimization system 100 advantageously can determine one or more updated operating parameters for the network connection 120 based upon the increased available bandwidth. Stated somewhat differently, the connection optimization system 100 can detect that the network connection 120 of FIG. 3C has sockets $128_1$, $128_2$, $128_3$, . . . , $128_X$, $128_C$ available for supporting X+1 simultaneous data streams. The connection optimization system 100 thus can endeavor to maintain the data transmission via the network connection 120 and include the selected data channel $128c$ in the data transmission.

The one or more updated operating parameters for the network connection 120, for example, can include, but are not limited to, the updated data buffer size value, at 260, and/or the updated socket count value, at 270. Accordingly, the connection optimization system 100 can enable utilization of the increased available bandwidth of the network connection 120 due to the selected data channel $128_C$ of the network connection 120 becoming available for data transmission. Accordingly, the connection optimization system 100 can detect bandwidth changes for the network connection 120 and determine one or more operating parameter values for adjusting operation of the network connection 120 during data transmission to the utilize the available bandwidth of the network connection 120.

Although shown and described with reference to FIG. 3C as comprising a single additional available data channel $128_C$ for purposes of illustration only, more than one data channel 128 of the network connection 120 can be reallocated for use in the data transmission between the first and second network components 110A, 110B. The connection optimization system 100, while monitoring the amount of packet loss, at 240 (shown in FIG. 2), can detect this further-increased available bandwidth of the network connection 120. The connection optimization system 100 advantageously can determine one or more updated operating parameters for the network connection 120 based upon the further-increased available bandwidth. The connection optimization system 100 thus can detect the further bandwidth change for the network connection 120 and determine one or more updated operating parameter values for adjusting operation of the network connection 120 during data transmission to the utilize the available bandwidth of the network connection 120.

The connection optimization system 100 and method 200 therefore can use a full bandwidth available between the transmitting (or source) network component 110 and the receiving (or destination) network component 110 connected by a Transmission Control Protocol (TCP) network connection. The TCP network connection can have a well-defined round-trip time (RTT) latency and/or a changing bandwidth. The source network appliance 110 can modify a size of a single buffer sent at once and/or a number of simultaneous TCP data streams. For each connection with RTT and bandwidth, the connection optimization system 100 and method 200 advantageously can continue to use the buffer and scale number of the TCP streams proportionally to the change in bandwidth. The connection optimization system 100 and method 200 thereby can quickly select one or more optimal parameters for the TCP transfer with a significant (or large) RTT.

The connection optimization system 100 and method 200 can depend on a size of the transmitted block (or buffer size). Additionally and/or alternatively, the connection optimization system 100 and method 200 can depend on a predetermined number parallel of TCP streams (or socket count). Higher number of streams can lead to higher line utilization. The connection optimization system 100 and method 200 optionally can depend on Return Trip Time (or RTT). The RTT can comprise a preselected amount of time needed for a packet to travel from a proximal end region of the network connection to a distal end region of the network connection and back to the proximal end.

In selected embodiments, the proximal end region of the network connection 120 can be associated with the transmitting (or source) network component 110; whereas, the distal end region of the network connection 120 can be associated with the receiving (or destination) network component 110. A higher RTT can lead to lower line utilization of the network connection. Additionally and/or alternative, the method can depend on line throughput (or bandwidth), wherein a higher throughput can lead to lower line utilization by a single TCP stream.

The connection optimization system 100 and method 200 advantageously can enable quick determination of the optimal parameters for the transmission. For example, over 93% utilization can be achieved on a 10 Gigabits per second line and over 96% utilization can be achieved 100 Gigabits per second line in selected embodiments.

Although various implementations are discussed herein, it will be understood that the principles described herein are not limited to such. For example, while particular scenarios are referenced, it will be understood that the principles described herein apply to any suitable type of computer network or other type of computing platform, including, but not limited to, a Local Area Network (LAN), a Wide Area Network (WAN), a Wireless Local Area Network (WLAN), a Metropolitan Area Network (MAN) and/or a Campus Area Network (CAN). As used herein, a phrase in the form of at least one of A, B, C and D herein is to be construed as meaning one or more of A, one or more of B, one or more of C and/or one or more of D.

Accordingly, persons of ordinary skill in the art will understand that, although particular embodiments have been illustrated and described, the principles described herein can be applied to different types of computing platforms. Certain embodiments have been described for the purpose of simplifying the description, and it will be understood to persons skilled in the art that this is illustrative only. It will also be understood that reference to a "server," "computer," "network component" or other hardware or software terms herein can refer to any other type of suitable device, component, software, and so on. Moreover, the principles discussed herein can be generalized to any number and configuration of systems and protocols and can be implemented using any suitable type of digital electronic circuitry, or in computer software, firmware, or hardware. Accordingly, while this specification highlights particular implementation details, these should not be construed as limitations on the scope of any invention or of what may be claimed, but rather as descriptions of features that may be specific to particular embodiments of particular inventions.

What is claimed is:

1. A method for optimizing a multi-stream network connection with a dynamic bandwidth, comprising:
    establishing a data buffer size value for the network connection;
    determining a socket count value based upon one or more defined parameters of the network connection;
    applying the established data buffer size value and the determined socket count value to the network connection having an initial available bandwidth value;
    initiating transmission of data across the network connection;
    monitoring an available bandwidth value of the network connection during the data transmission;
    detecting a change in the available bandwidth value of the network connection;
    establishing an updated data buffer size value for the network connection based upon the changed available bandwidth value of the network connection;
    determining an updated socket count value based upon the defined parameters and the changed available bandwidth value of the network connection;
    applying the established updated data buffer size value and the determined updated socket count value to the network connection; and
    continuing the data transmission across the network connection with the changed available bandwidth value,
    wherein said applying the established updated data buffer size value and the determined updated socket count value to the network connection increases utilization of the network connection as the available bandwidth value of the network connection changes.

2. The method of claim 1, wherein the multi-stream network connection comprises a Transmission Control Protocol (TCP) network connection.

3. The method of claim 1, wherein said determining the socket count value comprises determining the socket count value for the network connection based upon the initial available bandwidth value, a round trip time latency value of the network connection and the determined data buffer size value.

4. The method of claim 3, wherein said determining the socket count value comprises determining the socket count value as a product of the initial available bandwidth value and the round trip time latency value divided by the determined data buffer size value.

5. The method of claim 4, wherein the socket count value is within a range between 0.25K and 32K.

6. The method of claim 4, wherein the socket count value is equal to 1024.

7. The method of claim 1, wherein said detecting the change in the available bandwidth comprises detecting a change in a packet loss for the network connection.

8. The method of claim 7, wherein said detecting the change in the packet loss comprises comparing the packet loss with a predetermined packet loss threshold for the network connection.

9. The method of claim 1, wherein said detecting the change in the available bandwidth comprises detecting a reduced bandwidth value for the network connection, wherein said establishing an updated data buffer size value comprises establishing a reduced data buffer size value for the network connection based upon the changed available bandwidth value of the network connection and wherein said determining the updated socket count value comprises determining an increased socket count value based upon the defined parameters and the changed available bandwidth value of the network connection.

10. The method of claim 1, wherein said detecting the change in the available bandwidth comprises detecting an increased bandwidth value for the network connection, wherein said establishing an updated data buffer size value comprises establishing an increased data buffer size value for the network connection based upon the changed available bandwidth value of the network connection and wherein said determining the updated socket count value comprises determining a reduced socket count value based upon the defined parameters and the changed available bandwidth value of the network connection.

11. The method of claim 1, wherein said determining the updated socket count value comprises determining the updated socket count value for the network connection based upon the changed available bandwidth value, a round trip time latency value of the network connection and the determined data buffer size value.

12. The method of claim 11, wherein said determining the socket count value comprises determining the socket count value as a product of the changed available bandwidth value and the round trip time latency value divided by the determined data buffer size value.

13. The method of claim 1, further comprising monitoring the changed available bandwidth value of the network connection during said continuing the data transmission across the network connection, detecting a further change in the available bandwidth value of the network connection; establishing a further updated data buffer size value for the network connection based upon the further-changed available bandwidth value of the network connection; determining a further updated socket count value based upon the further-changed available bandwidth value of the network connection; applying the established further-updated data buffer size value and the determined further-updated socket count value to the network connection; and continuing the data transmission across the network connection with the further-changed available bandwidth value.

14. The method of claim 13, wherein said applying the established further-updated data buffer size value and the determined further-updated socket count value to the network connection increases utilization of the network connection as the available bandwidth value of the network connection changes.

15. A computer program product for optimizing a multi-stream network connection with a dynamic bandwidth, the computer program product being encoded on one or more non-transitory machine-readable storage media and comprising:

instruction for establishing a data buffer size value for the network connection;
instruction for determining a socket count value based upon one or more defined parameters of the network connection;
instruction for applying the established data buffer size value and the determined socket count value to the network connection having an initial available bandwidth value;
instruction for initiating transmission of data across the network connection;
instruction for monitoring an available bandwidth value of the network connection during the data transmission;
instruction for detecting a change in the available bandwidth value of the network connection;
instruction for establishing an updated data buffer size value for the network connection based upon the changed available bandwidth value of the network connection;
instruction for determining an updated socket count value based upon the defined parameters and the changed available bandwidth value of the network connection;
instruction for applying the established updated data buffer size value and the determined updated socket count value to the network connection; and
instruction for continuing the data transmission across the network connection with the changed available bandwidth value,
wherein application of the established updated data buffer size value and the determined updated socket count value to the network connection increases utilization of the network connection as the available bandwidth value of the network connection changes.

16. A system for optimizing a multi-stream network connection, comprising:
a network connection with a dynamic bandwidth; and
a processing system being configured for:
establishing a data buffer size value for the network connection;
determining a socket count value based upon one or more defined parameters of the network connection;
applying the established data buffer size value and the determined socket count value to the network connection having an initial available bandwidth value;
initiating transmission of data across the network connection;
monitoring an available bandwidth value of the network connection during the data transmission;
detecting a change in the available bandwidth value of the network connection;
establishing an updated data buffer size value for the network connection based upon the changed available bandwidth value of the network connection;
determining an updated socket count value based upon the defined parameters and the changed available bandwidth value of the network connection;
applying the established updated data buffer size value and the determined updated socket count value to the network connection; and
continuing the data transmission across the network connection with the changed available bandwidth value,
wherein application of the established updated data buffer size value and the determined updated socket count value to the network connection increases utilization of the network connection as the available bandwidth value of the network connection changes.

17. The system of claim 16, wherein said multi-stream network connection comprises a Transmission Control Protocol (TCP) network connection.

\* \* \* \* \*